Nov. 19, 1940.   E. L. FISCHER   2,221,943
FLOW METER
Filed July 5, 1933   3 Sheets-Sheet 1

Inventor
Edward L. Fischer
By Brown, Jackson, Boettcher & Dienner
Attys.

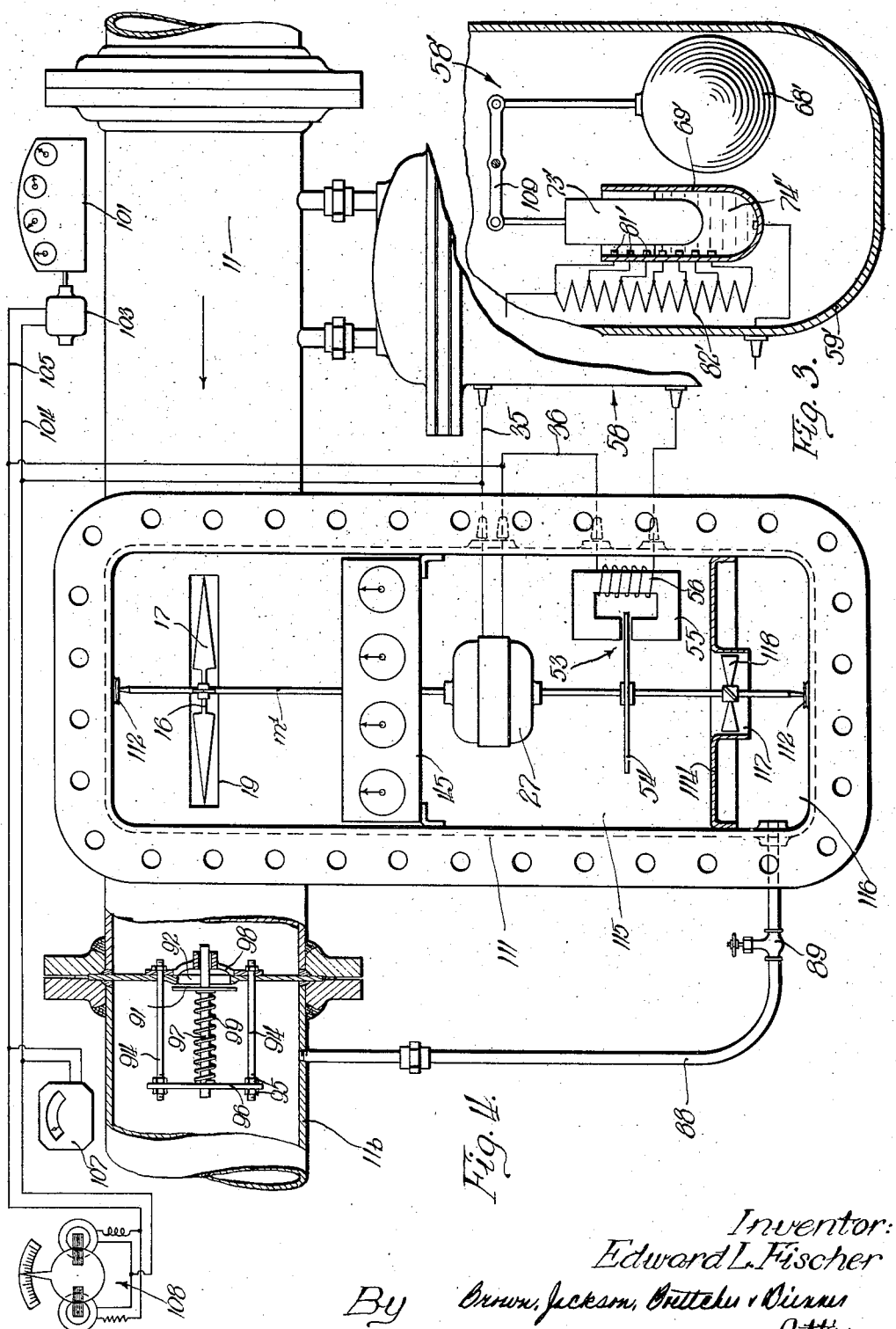

Patented Nov. 19, 1940

2,221,943

UNITED STATES PATENT OFFICE 2,221,943

FLOW METER

Edward L. Fischer, Davenport, Iowa

Application July 5, 1938, Serial No. 217,356

6 Claims. (Cl. 73—230)

The present invention relates to flow meters, particularly of the type for the metering of gaseous or vaporous substances such as natural gas, manufactured gas, steam, air or any other substances in vapor phase flowing through pipes or conduits.

One of the objects of the invention is to provide an improved flow meter which will register the amount of such gaseous material flowing in a pipe or conduit, in terms of (1) the weight of such material, or (2) the volume of such material at flowing conditions, or (3) the volume of such material corrected to any stated conditions of pressure and temperature, whichever may be required.

Another object of the invention is to provide an improved flow meter which does not require any outside source of electrical energy or other power. In such improved construction, electrical energy is utilized in the performance of certain control functions, and, in several embodiments of the invention, electrical energy is also utilized for the transmission of power between the operating parts. However, such electrical energy is generated directly in the meter apparatus, and hence there is no necessity for maintaining batteries at the meter location, nor of running a power supply line thereto.

Other objects and advantages of the invention will be apparent from the following detail description of certain preferred embodiments thereof.

In the accompanying drawings illustrating such embodiments:

Figure 3 is a fragmentary sectional view diagrammatically illustrating another embodiment of density responsive device which I may employ;

Figure 4 is a diagrammatic representation of another embodiment of the invention;

Figure 1:
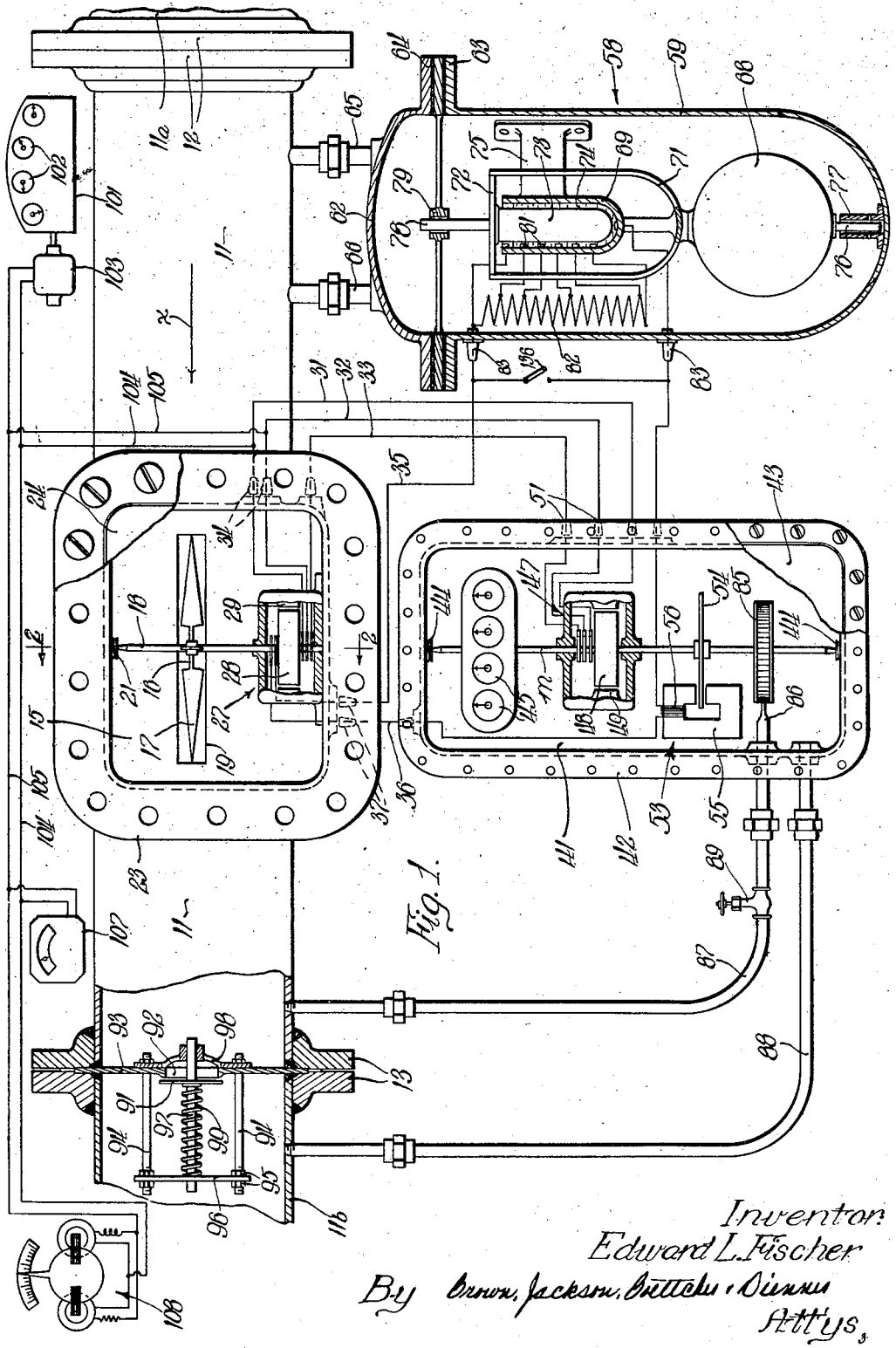
Figure 1 is a diagrammatic representation of one embodiment.
Figure 2:
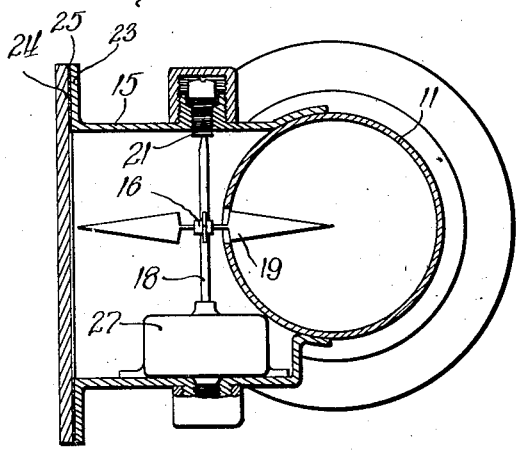
Figure 2 is a transverse sectional view taken approximately on the plane of the line 2—2 of Figure 1.

Referring to Figure 1, a section of the conduit through which the fluid flows is indicated at 11, the direction of flow therethrough being designated by the arrow x. The conduit section 11 may be a specially constructed section adapted to have certain parts of the metering apparatus mounted thereon or associated therewith, this specially constructed section being interposed in the run of the conduit and being coupled to the contiguous end portions 11$^a$ and 11$^b$ by the coupling flanges 12, 12 and 13, 13. Rigidly secured to the side, top or bottom of the conduit 11 is a housing 15 in which is mounted an impact wheel 16. This wheel comprises four or more vanes 17 which preferably extend substantially radially from a central hub which is mounted on a shaft 18. The vanes revolve through a slot 19 cut longitudinally in the conduit 11, whereby the fluid flow impacts against the vanes and causes their rotation. As shown in Figure 2, the tips of the vanes reach substantially to the center of the conduit 11 so that the vanes respond to an average of the flow velocities at different radii of the conduit. In this regard, the sector shaped profile of the vanes is in accordance with the teaching of my prior Patent No. 2,082,539 issued June 1, 1937. Also, if desired, the opposite edges of each vane may be curved in accordance with the teaching of said Patent No. 2,082,539. The shaft 18 may be supported in bearings carried by the housing 15 or in bearings carried by the generator 27, or both, the upper bearing 21 representing an anti-friction or jewel bearing carried by the housing, which may be duplicated at the lower end of the shaft, if desired. The front of the housing 15 is provided with a marginal flange 23 to which a removable cover plate 24 is secured by screws or bolts, a gasket 25 being interposed between the flange and cover plate to insure a pressure-tight enclosure. The inner portion of the housing 15 may be bolted to the conduit 11, or the housing may be welded to or cast integral with the conduit to minimize the possibility of leaks. The generator 27 is mounted on or otherwise driven by the shaft 18, and is preferably in the form of a relatively small alternator provided with a three phase winding for power transmission purposes, and also with a single phase winding for energizing a control circuit. However, as will hereinafter appear, the device 27 may assume the form of any one of several types of generators, or may consist of a synchronizing transmitter unit. In the above described arrangement employing an alternator which generates a three phase current and a single phase current, the three phase winding and the separate single phase winding are both preferably mounted on the rotor, although both windings might be mounted on the stator. When the windings are mounted on the rotor, current connection therewith is established through conventional slip rings, as shown. Field excitation may be effected from an outside source of current supply, but in keeping with the object of my invention to avoid the necessity of such outside source of current supply, I propose using a permanent magnet field, this being embodied in the form of a stator 29 when the windings are mounted on the rotor 28. The conductors 31, 32 and 33 for the three phase circuit are extended out of the housing 15 through insulating bushings 34, and the conductors 35 and 36 of the single phase circuit are extended out of the housing through insulating bushings 37, whereby the housing may be maintained gas-tight.

The indicator or register which integrates the flow over a period of time can be mounted in close proximity to the housing 15, or can be located a substantial distance therefrom. This apparatus is enclosed within a separate gas-tight housing 41 which is provided with a front marginal flange 42 to which a removable front cover 43 is secured in much the same manner as described above in connection with the housing 15. Enclosed within this housing is a rotary member $m$ on which the various driving and braking forces are imposed in the controlled operation of the system. This rotary member is typically represented by a shaft having precision, antifriction mounting in bearings 44, 44 carried by the opposite end walls of the housing 41. The rotation of said shaft actuates integrating counters or dials 45 of any conventional type, these integrating devices being enclosed within the housing 41 and being visible through a glass covered sight window in the cover plate 43.

Mounted on or operatively connected with the shaft $m$, within the housing 41, is an electric motor 47 serving to drive the shaft. When the generator 27 is a three phase alternator, the motor 47 is preferably a three phase synchronous motor. Here again, the three phase windings may be mounted either on the rotor 48 or on the stator 49, although they are preferably mounted on the rotor, in which case the rotor has conventional slip rings as shown for connection with said windings. Likewise, the field is preferably a permanent magnet structure to avoid the necessity of external excitation, this permanent magnet structure preferably constituting the stator 49. The three phase conductors 31, 32 and 33 enter the gas-tight housing 41 through insulating bushings 51 for connection with the rotor windings. By having an identical or related arrangement of windings, salient poles etc. in the alternator 27 and in the synchronous motor 47, an electrically synchronized relation is established which causes the motor to run at the same speed as the alternator or at some fixed speed ratio thereto. This electrically synchronized relation is substantially equivalent to a direct mechanical drive between the driving shaft 18 and driven shaft $m$, insofar as the ability to transmit torque or load in either direction is concerned. That is to say, one of the fundamental features of the present system is the step of imposing a controllable braking retardation or counter torque on the driven shaft $m$ in the performance of one of the control functions, and when such braking retardation is increased for reducing the speed of said driven shaft this speed retarding effect is transmitted back through the electrically synchronized motion transmitting parts to slow down the speed of the driving shaft 18 substantially proportionally to the reduction of speed of the driven shaft $m$.

The controllable braking retardation or counter torque which is imposed on the rotary member $m$ may be effected by any suitable short circuited generator or like device, indicated generally at 53. In the preferred embodiment illustrated I employ a Faraday disk 54 which is secured to the rotary member $m$ and which is responsive to a damping electromagnet 55. Said electromagnet has poles disposed on opposite sides of the disk 54, and includes a winding 56 which is adapted to be energized by the single phase current supplied through the conductors 35 and 36. It will be understood that increasing and decreasing the current flow through the winding 56 increases and decreases the counter torque or retardation imposed on the rotary member $m$ through the disk 54.

In the embodiment of the invention illustrated in Figure 1, such increase and decrease of current flow is arranged to be inversely responsive to changes of density in the fluid flowing through the conduit 11, as well as directly responsive to the speed of the generator. This change in current due to density changes is effected through a density responsive device 58 comprising a main casing 59 closed by a removable casing head 62 which is secured to the main casing by the attaching flanges 63 and 64, and forms therewith a gas-tight chamber. This chamber has a communication through the two pipes 65 and 66 with the conduit 11, the provision of the two pipes serving to maintain a small degree of circulation through the closed chamber and insuring that the density of the gas therein is the same as the density of the gas in the conduit 11. Within the closed casing 59 is a large, hollow, hermetically sealed chamber 68 which is of light, rigid material, the diagrammatic illustration thereof in Figure 1 representing either a sphere or one end of a relatively long cylinder. The weight of this chamber 68 is sustained by mercury displacement in an upper contact chamber 69 so that the chamber 68 is gas buoyant and hence rises and falls with varying gas densities in the casing 59. Secured to the upper side of the buoyant chamber 68 is a light cage comprising a plurality of spaced upwardly extending arms 71 which have attachment at their upper ends to a disk or spider 72. A displacement plunger 73 extends downwardly from this disk or spider into a quantity of mercury 74 contained within the mercury cup 69. Said mercury cup is stationarily supported by a bracket 75 extending outwardly therefrom between the cage arms 71 and having attachment to the casing 59. The vertically movable assembly 68, 71, 72 and 73 is guided by a guide pin 76 extending downwardly from the buoyant chamber 68 and sliding within a stationary guide 77, and by an upper guide pin 78 extending upwardly from the disk or spider 72 and sliding within a guide strut or spider 79 which may be clamped between the flanges 63 and 64. The mercury cup 69 is composed of suitable insulating material, and embedded in the inner surface thereof are a plurality of vertically spaced contacts 81 with which the mercury 74 successively makes and breaks contact in the fall and rise of the buoyant chamber 68. These contacts are connected with spaced taps on a resistor 82 which is preferably enclosed within the casing 59. The two single phase conductors 35 and 36 enter the casing through insulating bushings 83 and connect with the upper and lower ends of the resistor 82, or with upper and lower contacts 81, or with both said contacts and the resistor.

The parts are so proportioned that when the gas within the casing 59 is at a predetermined minimum density or low density, compared to a selected standard of density, the buoyant chamber 68 will move downwardly substantially to its lowermost position, thereby lowering the displacement plunger 73 to its maximum depth within the cup 69, causing the mercury 74 to rise and make contact with substantially all of the contacts, whereby all or the major portion of the resistance value of resistor 82 is shunted out of circuit so that a relatively large current flow passes through the winding 56 on the electromagnet 55. The greater flux density thereby caused to thread through this electromagnet and through the retarding disk 54 interacts with the increased current generated in said disk to impose a greater braking retardation or counter torque on the rotary member m, thereby resulting in a slower rate of integration at the dials 45, corresponding to the lower density of the gas. Conversely, when the density of the gas within the casing 59 rises to a predetermined maximum or high value relatively to this same standard of density, the buoyant chamber 68 moves upwardly and withdraws a substantial portion of the displacement plunger 73 from the mercury cup 69 so that the mercury level therein falls to its lowest point and breaks contact with all or most of the contacts 81. This interposes all or most of the resistance of element 82 in series with the winding 56 so that the current flow therethrough is reduced. Consequently, less braking retardation or counter torque is imposed on the rotary member m, and accordingly the integrating dials 45 are advanced more rapidly, corresponding to the increased density of the gas flowing through the conduit 11. The spacing of the contacts 81 in the mercury cup 69 or the spacing of the taps which lead from the resistor 82 to these contacts may be varied as desired to give a straight line variation in the totalizing integration proportionately to change in density of the gas, or to give any other desired variation in the integration. The speed changes which are thus exercised over the rotary member m by changes in the density of the gas are transmitted back as load variations to the alternator 27 so that the speed of this alternator and of the vane wheel 16 varies substantially proportionately therewith.

Small losses are likely to arise in the system as thus far described, due to reduction in driving torque by reason of vane speed, also retarding torque caused by friction, windage, etc., also voltage drop in the alternator 27 due to the current drawn from it to operate the synchronous motor 47 and to energize the winding 56 of the electromagnet 55, and also the effect of any voltage generation in said coil 56 by the action of current flow in the disk 54. These losses, while small compared to the driving torque, may become, especially at light loads, sufficient to cause inaccuracies which might be regarded as objectionable in some installations. Accordingly, I have devised improved means for compensating for these losses, which may be incorporated in the apparatus, if desired. This compensating means comprises an impulse wheel 85 which is mounted on or connected with the rotary member m, said wheel comprising peripheral vanes or pockets against which a jet of the measured gas or other fluid is discharged through a nozzle 86. The nozzle 86 extends through the wall of the casing 41 and connects through a pipe 87 with the gas conduit 11. After the gas has impinged against the impulse wheel 85, it is returned from the housing 41 back to conduit section 11b through pipe 88. A control device, preferably in the form of a needle valve 89, is interposed in the pipe 87 for controlling the flow of gas to the impulse wheel. Suitable means is disposed in the gas conduit to establish a pressure differential between the points of communication of the pipes 87 and 88 with said conduit. I preferably employ a spring pressed valve 91 adapted to restrict the flow of the gas through a valve port 92 formed in a diaphragm plate 93. This assembly can be conveniently mounted in the gas conduit by clamping the edge of the diaphragm plate 93 between the coupling flanges 13 which connect the conduit sections 11 and 11b. Rods 94 projecting posteriorly from the diaphragm plate have threaded rear ends for receiving nuts 95 which adjustably support the strut or spider 96. The valve 91 is mounted on a stem 97 which is slidably guided at one end in said strut or spider, and which is guided at its other end in the hub of a spider 98 which is secured to the front side of the diaphragm plate 93. A compression spring 99 is mounted on the stem 97 between the valve 91 and the strut 96, and by screwing the nuts 95 backwardly or forwardly said strut can be shifted to adjust the pressure of said spring 99. By appropriately adjusting the positions of these nuts, and by adjusting the setting of the needle valve 89, any desired rate of flow of gas impinging against the impulse wheel 85 may be obtained to afford any desired degree of compensation. The yieldable mounting of the valve 91 accommodates changes of velocity of the gas within the conduit.

The gas flow through the conduit can be indicated or registered at a remote point by the transmission of electrical energy from the generator 27 to a remote indicating or registering device. A remote register is diagrammatically indicated at 101, the latter comprising the conventional series of integrating dials or counters 102 which are arranged to be driven by an alternating current motor 103. The motor may be a three phase synchronous motor connected to the three phase circuits 31, 32 and 33, although a small, self-starting single phase motor, of the general type widely used in electric clocks, is entirely adequate. A single phase circuit 104, 105 is shown as being extended from one of the three phases 31, 32 and 33 to the motor 103, although this single phase circuit might be branched from the single phase control circuit 35, 36, or might even be energized by a separate winding on the alternator 27. A direct reading indication of the rate of gas flow at any time can also be given through remotely located indicators responsive either to voltage or frequency. A meter responsive to voltage is indicated at 107, this meter being connected to the branch circuit 104, 105, and being any suitable type of volt meter calibrated to indicate the rate of gas flow in terms of the voltage generated by the alternator 27. A meter responsive to frequency is conventionally indicated at 108, this meter also being energized through the remote indicating circuit 104, 105, and being calibrated to indicate the rate of gas flow in terms of the frequency being generated at any given instant by the alternator 27.

Referring now to the operation of the embodiment illustrated in Figure 1, gas flowing through the conduit 11 strikes against the vanes 17 with a force proportional to the product of the density $d$ of the gas and the square of its velocity $v$ (neglecting for the moment the speed of movement of the vanes). Since these vanes are mounted on a shaft 18 which is free to rotate, such force creates a torque $T_g$ on generator shaft 18 proportional to $dv^2$, and the resulting rotation of the rotor 28 induces an electromotive force in E in the windings of the alternator 27. Since the flux set up by the permanent magnet is constant, the voltage E will be proportional to the speed of rotation $S_g$ of the generator shaft 18. The voltage E will cause a current flow through the windings of synchronous motor 47, which current will exert a torque $T_m$ on the rotor 48 of the synchronous motor, causing it to rotate for driving the integrating dials 45 and also driving the disk 54. The single phase winding in the alternator 27 will establish a voltage in the control circuit 35, 36 which will remain equal or proportional to the voltage E established in the three phase circuit 31, 32 and 33 during different speed changes of the alternator. This voltage in the control circuit will cause current to flow through resistor 82, contacts 81, mercury 74, and the winding 56 on the electromagnet 55. The current through this winding of the electromagnet will cause the magnetic flux F to pass from pole to pole through the disk 54, and this flux will induce current flow in the disk 54 which will in turn react with the flux to cause a counter torque or braking retardation $T_r$ to be exerted on disk 54, opposite to its motion. It is well known in the art that the torque $T_r$ exerted on disk 54 in a direction opposite to its motion is a function of the product of the flux F and the motor speed $S_m$. The flux F created in the electromagnet 55 is proportional to the current I flowing through the winding 56 of said electromagnet. The retarding torque $T_r$ then is proportional to the product of current I through the winding 56 of the electromagnet 55 and the speed $S_m$ of shaft $m$, i. e.; $T_r = KS_m I$ (K representing a constant).

The current I, assuming the impedance of the circuit constant and neglecting for the moment any electromotive force that may be generated in the winding 56 of the electromagnet 55 by the action of the current flow in the disk 54, will be proportional to the voltage E. As previously mentioned, the voltage E is proportional to the speed $S_g$ of the generator 27.

Since the speed of the synchronous motor 47 must be proportional to the speed of the generator 27, or equal to the speed of the generator if both have the same number of poles, then $S_g$ is proportional to $S_m$, and the torque $T_r$ becomes proportional to the square of speed $S_m$. This may be seen more clearly by tracing through the following mathematical equations in which K, $K_1$, $K_2$, etc., represent constants applicable to different portions or operations of the apparatus:

(1) $T_r = KS_m F$ but (2) $F = K_1 I$

Substituting $K_1 I$ for $F$ in (1)

(3) $T_r = K\ K_1\ S_m I$ but (4) $I = K_2 E$ (assuming constant impedance)

Substituting $K_2 E$ for $I$ in (3)

(5) $T_r = K\ K_1 K_2 S_m E$ but (6) $E = K_3 S_g$

Substituting for E in (5)

(7) $T_r = K\ K_1 K_2 K_3 S_m S_g$ but (8) $S_g = K_4 S_m$

Substituting for $S_g$ in (7)

(9) $T_r = K\ K_1 K_2 K_3 K_4 S_m^2$ or (10) $T_r = K_5 S_m^2$

Now, neglecting losses due to friction, windage, etc. the speed $S_g$ of alternator 27 will increase until the retarding torque $T_r$ becomes equal (if $S_g$ and $S_m$ are equal) to the driving torque $T_g$ created by the force of the flowing gas on vanes 17, which, as previously pointed out, is proportional to the product of the density $d$ and the square of velocity $v$ of the flowing gas. Thus, the product of density $d$ and the square of velocity $v$ becomes proportional to the square of the speed $S_m$, or expressed as an equation:

(11) $\qquad dv^2 = KS_m^2$ whence

(12) $\qquad S_m^2 = \dfrac{dv^2}{K},\ \text{or}\ S_m = K_1 v\sqrt{d}$

Therefore, if $d$ be constant, that is if the gaseous material is of unchanging composition and unvarying as to pressure and temperature, the square root of $d$ is constant and the speed $S_m$ becomes proportional to the velocity $v$ or, inasmuch as the area of the conduit is constant, proportional to the rate of flow or volume of flow per unit time and, hence, each revolution of rotary member $m$ represents a given volume of the flowing gaseous material. Therefore, by proper proportioning of the gear ratio of the index or integrating device 45 such index or integrating device may be caused to indicate the volume of gaseous material passed during any period of time.

If the density of the flowing gaseous material be not constant but varying from time to time, the speed $S_m$ of rotary member $m$ will vary in proportion to the square root of such changes unless the function of the density responsive device 58 be introduced as a correcting factor, i. e., unless the current I in the winding 56 of electromagnet 55 be varied in such a way as to be proportional or inversely proportional to the density. As previously described, the gaseous material flowing in conduit 11 is lead into and out of casing 59 through pipes 65 and 66, and is therefore present at all times in casing 59 at density $d$. There will therefore be exerted on closed chamber 68 a buoyancy tending to lift this chamber and its attached parts against the action of gravity. This force of buoyancy will be at all times proportional to the density of the gaseous material. The net downward force will therefore decrease as the density increases, thus requiring less mercury displacement to float the chamber 68 and its attachments, and hence the chamber will rise sufficiently so that the weight of mercury displaced by displacement plunger 73 will again be equal to the net downward force on chamber 68 and its attached parts. As the plunger 73 rises the level of the mercury 74 in cup 69 falls, and if plunger 73 and cup 69 be of uniform cross section the fall in mercury level will be proportional to the increase in density of the gaseous material. Similarly, if the density be reduced, the mercury level will rise. The mercury level will therefore be inversely proportional to the change in density. By suitable arrangement of the contacts 81 and their tapped points of connection with the resistor 82, the impedance of the circuit of the coil 56 of the electromagnet 55 may be varied directly proportional to the level of mercury in the cup 69. Since the level of mercury in this cup is inversely proportional to the density $d$ of the gaseous material, the impedance of the electromagnet coil circuit may thereby be made to vary directly proportional to the density $d$. Assuming contacts 81 and their tapped points of connection with resistor 82 to be arranged in the above described manner so as to cause the impedance Z of the coil circuit of electromagnet 55 to vary directly with the density $d$, then current I becomes equal to voltage E divided by impedance Z, or proportional to E divided by $d$, that is inversely proportional to $d$.

Thus

(13) $\quad I = K_2 \dfrac{E}{d}$

Substituting this value of I in Equation (3) above we have

(14) $\quad T_r = \dfrac{KK_1 K_2 S_m E}{d}$

Substituting this value of E from Equation (6)

(15) $\quad T_r = \dfrac{KK_1 K_2 K_3 S_g S_m}{d}$ or since $S_g = K_4 S_m$

(16) $\quad T_r = \dfrac{KK_1 K_2 K_3 K_4 S_m^2}{d}$ or

(17) $\quad T_r = \dfrac{K_5 S_m^2}{d}$ but

(18) $\quad T_r = T_o$ and since

(19) $\quad T_o = \dfrac{dv^2}{K}$ we have

(20) $\quad \dfrac{dv^2}{K} = \dfrac{K_5 S_m^2}{d}$ and

(21) $\quad S_m^2 = \dfrac{dv^2}{K} \times \dfrac{d}{K_5} = \dfrac{d^2 v^2}{KK_5} = K_6 d^2 v^2$ or

(22) $\quad S_m = K_7 dv$

The speed is therefore proportional to the product of density $d$ and velocity $v$ or, since the area of conduit 11 is constant, the speed is proportional to the product of density and volume of flow, which means that it is proportional to the weight or mass of gas flow. Each revolution of shaft $m$ will therefore represent a definite weight of gaseous material flowing in conduit 11, and the index or counter 45 with proper gear ratio may be calibrated to represent the weight of gas passed during a given period.

For gaseous material of constant composition, a given volume of such gas at a stated pressure and temperature will have a definite weight. If, therefore, it is desired to ascertain the volume of gaseous material passing through conduit 11, corrected to a given pressure and temperature condition, the gear ratio of the index device 45 may be made such that it will so register.

If it is desired to measure the actual volume of flow at flowing conditions of a fluid of changing density, then the density responsive device within the casing 59 would be modified to have a reversed operating relation, as indicated at 58' in Figure 3. In this arrangement, the gas buoyant chamber 68' is pivotally suspended from one end of a balance or lever 109, and the plunger 73' is pivotally suspended from the other end of said balance, the intermediate fulcrum pivot being suitably carried by the casing. The two arms of this balance are shown as being of equal length, but they may have any desired ratio for different conditions. With this arrangement, an increased gas density in causing the chamber 68' to rise will cause plunger 73' to fall, whereby the level of the mercury 74' in cup 69' will rise with increased gas density and fall with decreased gas density, thus causing the impedance of the circuit to vary inversely with the density, with the result that the current in the circuit will vary directly with the density. Under these conditions, the retarding or counter torque $T_r$ will be proportional to the product of the square of the speed and the first power of the density, thus:

(23) $\quad T_r = K S_m^2 d$

Neglecting losses, the driving torque $dv^2$ is equal to the retarding torque $S_m^2 d$, thus:

(24) $\quad K_1 dv^2 = K S_m^2 d$ whence

(25) $\quad S_m^2 = \dfrac{K_1 dv^2}{Kd}$ or $S_m^2 = K_2 v^2$ whence $S_m = K_3 v$ The speed S is therefore proportional to the velocity $v$, or since the area of conduit 11 is constant, the speed is proportional to the volume of flow. Each revolution of shaft $m$ will therefore represent a definite volume of gas flow at flowing conditions, and the index or counter 45 with proper gear ratio may be calibrated to represent the volume of gas passed during a given period.

All of the above explanation and discussion has neglected any reduction in driving torque by reason of vane speed, any retarding torque caused by friction, windage, etc., any voltage drop in the alternator 27 due to the current drawn from it to operate the synchronous motor 47 and the electromagnet 53, and also the effects of any voltage generation in the coil 56 of said electromagnet by the action of current flow in the disc 54. These effects, while small compared to the driving torque, may become sufficient, particularly at light loads, to cause inaccuracies unless some means of compensation is provided. Considering these effects in the order above mentioned:

*(1) Loss of driving torque by reason of motion of the impact vanes*

The speed of motion of the vanes 17 will reduce the applied driving torque below the value that would be effective on a single stationary vane extending at right angles to the gas flow, this being evident from the fact that the torque or force is a result of the relative velocities between the gas and the vane. Accordingly, in the preferred embodiments of my invention herein disclosed, the vane speed is preferably kept low relative to the gas velocities, so that the driving torque will be affected by the vane speed as little as possible. Such reduction in driving torque will be proportional to the speed.

*(2) Friction*

The retarding torque due to friction, assuming uniform bearing conditions, will be approximately proportional to the speed.

(3) Windage

The windage will be small but whatever it is it will vary in proportion to the square of the speed.

(4) Voltage drop in the generator

Since the resistance of the generator windings (neglecting temperature rise) will be constant, the voltage drop in the generator windings will be directly proportional to the current supplied by the generator. The current thus supplied must provide the driving torque for shaft $m$ through the instrumentality of the synchronous motor 47, and must also energize the coil 56 of the electromagnet 53. The load on the synchronous motor 47 is primarily caused by the retarding torque $T_r$ and is therefore proportional to the square of the speed. The current through coil 56 of the electromagnet 53 is, except for changes in density, proportional to the speed. The current supplied by the generator then is proportional to some function of the speed $S_g$ or $S_m$ greater than the first power but less than the square.

(5) Voltage generation by currents in disc 54 affecting flux from core 55 of electromagnet 53

The disc 54 being in the path of flux from the electromagnet 55, would act, if stationary, as a short circuited winding of a transformer in which the coil 56 of the electromagnet would then be the primary.

Acting as such a short circuited secondary winding of a transformer, the disc 54 would merely change the effective impedance of the transformer circuit and since the disc 54 is of uniform resistance, its rotation will not change the effective impedance of the transformer circuit from whatever its value would be if stationary. The action when the disc rotates may be likened to that of a series dynamo, since the value of the current generated in the disc caused by its motion is proportional to its speed and the magnitude of the flux. The magnitude of the flux is in turn proportional to the speed of the generator, so that the current generated in the disc is proportional to the square of the speed of the moving system. The magnetic effect of these currents would be opposite to that of the magnet coil on one side and in the same direction on the other side, thus tending to distort the flow of flux from the poles. This may or may not affect the current flowing in the magnet coil 56, but whatever effect it may have is proportional to the magnitude of the current generated in the disc by reason of its motion, and this is proportional to the square of the speed.

The counter torque due to these various losses above enumerated appears to vary then as a whole, with some function of the speed, greater than the first power but not as large as the square.

Referring now to the previously described compensating means 85—99 which compensate for these losses, it will be evident that under conditions of flow within the conduit 11 there will be a pressure differential between opposite sides of the diaphragm plate 93 which will be a function of the velocity of the gas. Assuming for the moment that the spring pressed valve 91 is locked at one fixed size of opening, the pressure differential across the diaphragm plate will then be proportional to the square of the gas velocity. The pressure differential will maintain a flow of gas from the upstream side of diaphragm plate 93 through pipe 87, valve 89 and nozzle 86 into housing 41, and from said housing this gas flow will be conducted through pipe 88 back to the downstream side of the diaphragm plate 93. In issuing from the nozzle 86, this gas flow will strike the impulse vanes of impulse wheel 85 and create a torque on the rotary member $m$. The arrangement is such that the direction of this torque is the same as that caused by the synchronous motor 47. The magnitude of this compensating torque will be proportional to the product of the density of the gas and the square of the velocity of the gas issuing from the nozzle 86. With a given setting of valve 89, this nozzle velocity will be proportional to the square root of the differential pressure existing between pipes 87 and 88 at their points of connection to conduit sections 11a and 11b. Assuming, as above stated, that the spring pressed valve 91 were to remain in fixed position, so that the port 92 would then function as a fixed orifice, the pressure differential which would then be maintained in the pipes 87 and 88 would be proportional to the square of the gas velocity, which would mean that the velocity of the gas issuing from the nozzle 86 would then be proportional to the velocity of the gas in the conduit 11, or proportional to the speed of rotary member $m$. However, this differential pressure is not proportional to the square of the velocity of the gas in the conduit 11 and this nozzle velocity is not proportional to the velocity of the gas in conduit 11 by reason of the fact that the position of the spring pressed valve 91 varies with changes of velocity and hence the port 92 is not a fixed orifice. The effective size of this port or orifice becomes larger as the pressure differential increases, inasmuch as this differential pressure acts on the valve 91 and pushes it back away from the port 92 against the action of the spring 99. The differential pressure is therefore no longer proportional to the square of the velocity of the gas in conduit 11, but becomes some lesser function of the velocity, depending upon the adjusted pressure of the spring 99.

It will be seen from the foregoing that by properly calibrating the pressure of the spring 99 and that by properly adjusting the effective area of opening through the valve 89, a compensating torque can be established in the impulse wheel 85 which will entirely or very closely compensate for the loss of torque on the vanes 17 and for the drag torque which arises from the various factors specifically enumerated above. Hence, by applying this compensating torque to the shaft $m$, the speed of this shaft can then be made truly proportional to the velocity or to the product of velocity and density, whichever may be desired.

Referring particularly to the fact that in the embodiment of my invention illustrated in Figure 1 there is no mechanical transmission of motion from the impact wheel 16 to the integrating counter 45, but, instead, the motion is transmitted electrically, such electrical transmission has certain obvious advantages in different types of installations where it may be desired to locate the integrating counter 45 at some distance from the gas conduit 11. Such electrical transmission of motion also has the added advantage of enabling the impact wheel 16 to be mounted in one gas-tight housing, and the compensating impulse wheel 85 to be mounted in a separate gas-tight housing, so that the compensating flow of gas impinging against the latter wheel 85 can possibly be calibrated more easily, independently of the gas entering the housing 15 through the impact wheel slot 19. However, where location of the integrating counter 45 at a remote point is not essential, it is entirely practicable to employ a mechanical drive from the impact wheel 16 to such integrating counter, as I shall presently describe in connection with Figure 4. Before describing this mechanical transmission arrangement, it is appropriate to point out that the electrical transmission disclosed in Figure 1 can be accomplished by different types of electrical apparatus. For example, although a three phase system is preferable from the standpoint of the starting characteristic of the motor 47 and of effective synchronized coupling between the alternator unit 27 and the motor unit 47, nevertheless these two units might be two phase, quarter phase or even single phase units. In each instance, the motor 47 should be self-starting, but this is common practice even in single phase units, as represented by self-starting, single phase clock motors. Furthermore, the self-starting requirement is not an acute problem in the present flow meter, because from a condition of rest the impact wheel 16 will come up to speed rather gradually, and this enables the motor unit 47 to come into concurrent operation more readily. Under some operating conditions, the motor unit 47 might be an induction motor, a repulsion-induction motor, a split-phase motor or any other suitable type of motor. Also, under some conditions, a direct current transmission system might be employed, in which case the motor unit 47 would preferably be appropriately compounded to closely approximate the desired speed-voltage characteristic. In any single phase alternating current system, the branch circuit which energizes the electromagnet coil 56 and the branch circuit which energizes the remote indicating devices 101, 107 and 108, could both be tapped off the single phase transmission circuit, or a separate single phase winding could be provided in the alternator 27 for energizing such branch circuits. In the case of a direct current system, the electromagnet coil 56 would be energized by this direct current through its branch circuit substantially in the same manner previously described, but the remote indicating devices 101, 107 and 108 would have to respond to voltage.

In the embodiment illustrated in Figure 4 I have disclosed a direct coupled arrangement in which the torque transmitting relation between the impact wheel 16, integrating counter 45 and retarding disc 54 is by virtue of a mechanical drive rather than by an electrical drive. In this embodiment, all of the rotating parts can be enclosed within a single housing 111. Also, all of the rotating parts consisting of the impact wheel 16, the generator 27, the integrating counter 45 and the retarding disc 54 all have mechanical connection with a single rotary member $m^1$, the integrating counter 45 having an appropriate geared connection with said shaft $m^1$ for securing the proper speed reduction with respect to the impact wheel 16. The ends of the shaft $m^1$ have appropriate mounting in bearings 112 carried by the end walls of the housing 111. In this direct coupled embodiment, the generator 27 serves only to energize the winding 56 of the electromagnetic retarding apparatus 53, and also to energize the remote indicators 101, 107 and 108 if these remote indicators should be used. The generator 27 can therefore be an alternating current generator, such as the single phase alternator shown, or it can be a direct current generator, either type of current being adequate for the controlled energization of the winding 56. Where an accurate indication by the remote indicators 101, 107 and 108 is desired, the use of alternating current is preferable to the use of direct current. Where it is desired that the indication be proportional to the product of the velocity and density of the gas, the circuit 35, 36 leading from the generator 27 is extended through a density responsive device 58 in which the current flow is made to vary as a function of the density of the gas, as described of the device 58 in the embodiment of Figure 1. Where it is desired to measure actual volume at flowing conditions independently of density changes, the reversed arrangement of density responsive device 58' illustrated in Figure 3 would be employed.

In this direct coupled embodiment, the loss compensating means is motivated by the gas which enters the housing 111 through the slot 19 extending between said housing and the conduit 11. A partition 114 divides the housing 111 into upper and lower chamber areas 115 and 116. Extending through this partition is a circular passageway 117, and mounted on the shaft $m^1$, within this passageway 117, is a suitable vane or impulse wheel 118. A pipe 88 conducts gas from the lower chamber area 116 back to the conduit section 11b, this pipe communicating with the gas stream at a point posterior to the spring pressed valve 91, the same as described in the preceding embodiment. Thus, a pressure differential is maintained for establishing a flow of gas past the impulse wheel 118, and the volume of this flow can be accurately regulated by the needle valve 89 interposed in the pipe 88, substantially as described of the gas flow effective on the impulse wheel 85 of the preceding embodiment.

This direct connected embodiment of flow meter has the same mode of operation as the embodiment illustrated in Figure 1, and the same mathematical proof of accuracy is also applicable to this direct coupled embodiment.

Figure 5:
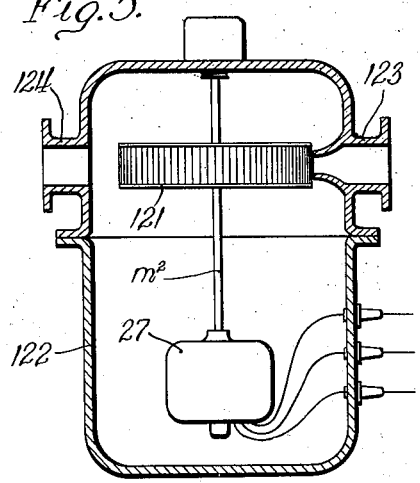
Figures 5, 6 and 7 are diagrammatic views showing other means for imparting the kinetic energy of the fluid to the generator or rotary member.
Figure 6:
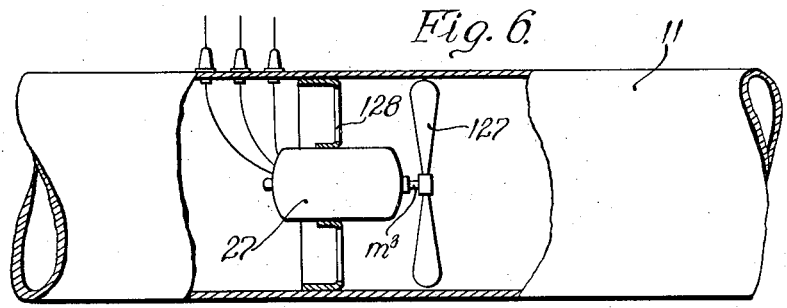
Figure 7:
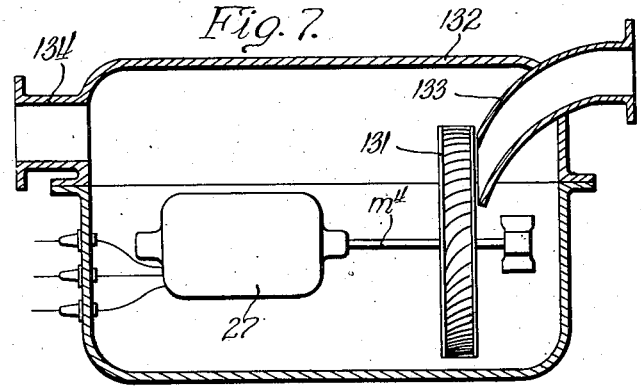

The impact energy of the gas flow may be converted into rotary motion by various other arrangements of fans, propellers, impulse wheels, etc., as illustrated in Figures 5, 6 and 7. In Figure 5 an impulse wheel 121 in the nature of a turbine wheel is substituted for the vane rotor 16 of the preceding embodiments. This impulse wheel is enclosed in a housing 122 through which the flow of gas passes. The stream of the gas enters the housing through a nozzle 123 which directs the gas substantially tangentially against the multiple vanes of the impulse wheel 121, and the gas leaves the housing through the outlet connection 124. The shaft or rotary member $m^2$ driven by the impulse wheel drives the generator 27. This form of the invention using such impulse wheel is particularly adapted to low capacity meters where the entire flow of gas can readily be led through a housing and a comparatively small nozzle or pipe. This form of the invention utilizing such impulse wheel can be employed either in the electrically coupled embodiment of the invention illustrated in Figure 1, or in the mechanically coupled embodiment of the invention illustrated in Figure 4.

Figure 6 diagrammatically illustrates the use of a fan or propeller type of impact wheel 127 which is disposed substantially axially within the gas conduit 11. This fan or propeller is mounted directly on the shaft $m^3$ of the generator 27, and the latter is supported within the conduit by a suitable spider structure 128. This arrangement of gas impelled wheel is more particularly adapted to the electrically coupled embodiment of the invention illustrated in Figure 1, although it will be understood that a geared or other mechanically coupled relation may be established with the rotary member $m^3$ for driving the mechanically coupled embodiment of the invention illustrated in Figure 4.

Figure 7 diagrammatically illustrates the use of an axial or side admission type of turbine wheel 131. The latter is enclosed in a housing 132, and the entering gas is discharged through a nozzle 133 laterally against the multiple vanes of the wheel, the gas being discharged from the housing through the outlet connection 134. The shaft or rotary member $m^4$ drives the generator 27. This form of the invention can also be employed in connection with either the electrically coupled embodiment illustrated in Figure 1 or with the mechanically coupled embodiment illustrated in Figure 4.

Any one of the impact wheels illustrated in Figures 5, 6 and 7 may be substituted for either of the compensating wheels 85 and 118 illustrated in Figures 1 and 4, if desired.

While I have illustrated and described what I regard to be the preferred embodiments of my invention, nevertheless it will be understood that such are merely exemplary, and that numerous modifications and rearrangements may be made therein without departing from the essence of the invention. For example, if it is desired to give an indication which is independent of changes of density of the gas in any of the embodiments of the invention, the functioning of the density sensing device 58 or 58' can be switched or cut out of the control circuit 35, 36, such as by the switch indicated in dotted lines at 136 in Figure 1, so that the current supplied by the generator 27 is fed directly to the winding 56 independently of any changes in the effective resistance of resistor 82 or 82'.

I claim:

1. In a flow meter of the class described, the combination of a rotary member, means responsive to fluid flow for rotating said member, indicating means actuated by said rotary member, and means for imposing a counter torque on said rotary member which is proportional to the product of the square of the speed of the flow responsive means and the reciprocal of the density of the fluid.

2. In a flow meter of the class described, the combination of a rotary member, a wheel rotated by the kinetic energy of the fluid flow and arranged for imparting driving torque to said rotary member, integrating means actuated by said rotary member, means for creating a counter torque in said rotary member which is varied by changes in the velocity and density of the fluid, and means for creating an accelerating torque in said rotary member which is varied by changes in the velocity of the fluid.

3. In a flow meter for gaseous fluids, the combination of an impact wheel responsive to the kinetic energy of the fluid flow, a generator driven by said impact wheel, integrating means driven by said impact wheel, electromagnetic means creating a counter torque for governing the speed of rotation of said integrating means, said electromagnetic means comprising a winding energized by current flow from said generator, a buoyancy element responsive to the density of the gaseous fluid, and means responsive to said buoyancy element for varying said current flow.

4. In a meter for measuring the flow of gaseous fluids through a conduit, the combination of an impact wheel revolved by the kinetic energy of the fluid flow through said conduit, an alternator driven by said impact wheel, a closed chamber, a rotary member mounted in said chamber, an electric motor having synchronous characteristics receiving alternating current from said alternator and connected to drive said rotary member, integrating means driven by said rotary member, apparatus for producing a counter torque in said rotary member comprising a winding for establishing a magnetic field, and a short circuited conductor driven by said rotary member for cutting said field, a circuit for conducting current from said alternator to said winding, a buoyancy element adapted to have motion in response to changes of density in the gaseous fluid, variable resistance means actuated by said buoyancy element for varying the current flow in said circuit, a compensating wheel within said closed chamber adapted to impart accelerating torque to said rotary member, a fluid bypass for conducting fluid from said conduit to said closed chamber for reacting against said compensating wheel and for returning the gas from said chamber to said conduit, and a spring pressed valve in said conduit for establishing a pressure differential between the inlet and outlet ends of said fluid bypass.

5. In a meter for measuring the flow of gaseous fluids through a conduit, the combination of an impact wheel driven by the fluid flow through said conduit, a closed chamber communicating with said conduit to receive fluid therefrom, a rotary member in said chamber mechanically coupled with said impact wheel to be driven thereby, integrating means driven by said rotary member, a generator driven by said rotary member, apparatus for establishing a counter torque in said rotary member comprising a winding for creating a magnetic field, and a short circuited conductor rotating with said rotary member and adapted to cut said field, a circuit for conducting current from said generator to said winding, a buoyancy element adapted to have motion in response to changes of density in the fluid flowing through said conduit, variable resistance means actuated by said buoyancy element for varying the current flowing through said circuit, a pipe for conducting gas from said closed chamber back to said conduit, means establishing an orifice in said conduit which varies in effective area with changes of velocity of the fluid, said variable orifice creating a pressure differential causing a flow of gas through said closed chamber and through said pipe, and means responsive to such flow of gas through said chamber for creating an accelerating torque in said rotary member.

6. In a flow meter, the combination with a conduit for the fluid, of a shaft extending approximately at right angles to the conduit and disposed substantially out of the path of flow, and a plurality of vanes on said shaft revolving through the conduit longitudinally thereof, said vanes being shaped substantially as sectors of the conduit area.

EDWARD L. FISCHER.